United States Patent [19]
Zee-Cheng et al.

[11] 3,835,140
[45] Sept. 10, 1974

[54] PROCESS FOR THE PREPARATION OF DEHYDROBERBINIUM SALTS

[75] Inventors: Kwang Yuen Zee-Cheng, Overland Park, Kans.; Chia-Chung Cheng, Kansas City, Mo.

[73] Assignee: The United States of America as represented by the Secretary of the Department of Health, Education and Welfare, Washington, D.C.

[22] Filed: Jan. 30, 1973

[21] Appl. No.: 328,074

[52] U.S. Cl..... 260/283 SY, 260/283 S, 260/286 R, 260/289 R, 260/289 A, 260/286 Q, 424/258
[51] Int. Cl.............................................. C07d 39/12
[58] Field of Search........ 260/287 R, 289 A, 286 Q, 260/283 SY

[56] References Cited
UNITED STATES PATENTS

| | | | |
|---|---|---|---|
| 3,022,309 | 2/1962 | Muller | 260/287 R |
| 3,240,782 | 3/1966 | Brossi et al. | 260/286 Q |
| 3,420,834 | 1/1969 | Muller | 260/287 R |

*Primary Examiner*—Donald G. Daus
*Assistant Examiner*—D. Wheeler

[57] ABSTRACT

A process for the synthesis of coralyne salts and related dehydroberbinium salts. The process includes a phenylacetyl chloride and phenylethylamine condensation, followed by cyclization, aromatization and formation of a dehydroberbinium sulfoacetate, which may thereafter be converted into other dehydroberbinium salts. The coralyne salts have antineoplastic activity.

12 Claims, No Drawings

PROCESS FOR THE PREPARATION OF DEHYDROBERBINIUM SALTS

This invention relates to dehydroberbinium salts and a novel process for their preparation. More specifically, the invention relates to a process for synthesizing dehydroberbinium salts of the following formula:

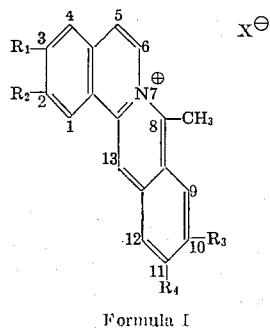

Formula I in which
R₁ and R₂ represent hydrogen, hydroxy, methoxy, ethoxy or, when taken together, methylenedioxy;
R₃ and R₄ represent hydrogen, hydroxy, methoxy or ethoxy; and
X represents a halide, nitrate, sulfate, phosphate or sulfoacetate.

A preferred compound in accordance with this invention is 8-methyl-2,3,10,11-tetramethoxy-dibenzo[a,g]quinolizinium chloride, also known as coralyne chloride. This compound, which is a dehydroberbinium salt of Formula I with R₁, R₂, R₃ and R₄ all being methoxy and X being chloride, is a naturally occurring plant alkaloid having physiological activity. For example, as reported by Craig et al, *Journal of American Chemical Society*, Vol. 70, pp. 2783–2785 (1948), this and related compounds are useful as curiform drugs to relax skeletal muscle by peripheral action, and are also useful as vasodepressors.

In accordance with one aspect of this invention, it has been found that coralyne salts such as coralyne chloride also possess antineoplastic activity against the P-388 lymphocytic and L-1210 lymphoid leukemia test systems.

Several methods are described in the literature for synthesizing dehydroberbinium salts and related compounds. These prior methods, however, have generally resulted in rather poor yields and have presented some difficulties in readily isolating and purifying the desired product.

According to the method of the present invention, the compounds of Formula I above are synthesized by the following general procedure which involves the preparation of the dehydroberbinium sulfoacetate which may then be converted to other salts of Formula I. The appropriately substituted phenylacetic acid is reacted with thionyl chloride to form the phenylacetyl chloride, which is then condensed with the appropriately substituted phenylethylamine to give the N-substituted phenylacetamide. The latter is cyclized by the action of a halogenated derivative of pentavalent phosphorus to the 3,4-dihydroisoquinoline, which is then aromatized by the action of palladium-on-charcoal to form the corresponding isoquinoline. Reaction of the isoquinoline with a mixture of acetic anhydride and sulfuric acid results in the formation of the dehydroberbinium sulfoacetate, which may then be converted by reaction with the appropriate salt of an alkali metal to other dehydroberbinium salts of Formula I.

More specifically, the process of the present invention is carried out by reacting a phenylacetic acid of the formula

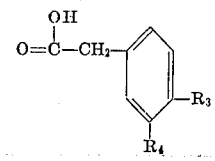

wherein R₃ and R₄ represent hydrogen, hydroxy, methoxy or ethoxy, with thionyl chloride to form the phenylacetyl chloride of the formula

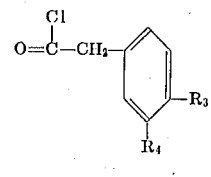

wherein R₃ and R₄ have the above-assigned meanings.

The phenylacetyl chloride is condensed with a β-phenylethylamine of the formula

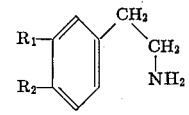

wherein R₁ and R₂ represent hydrogen, hydroxy, methoxy, ethoxy or, when taken together, methylenedioxy, in the presence of a base, to form the phenylacetamide of the formula

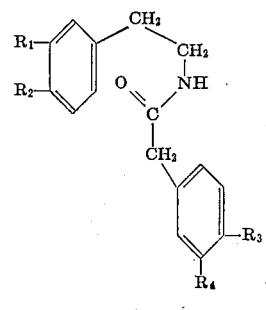

wherein R₁, R₂, R₃ and R₄ have the above-assigned meanings.

The phenylacetamide is cyclized by the action of a halogenated derivative of pentavalent phosphorus, such as phosphorus pentachloride, phosphorus oxychloride or phosphorus oxybromide, preferably in the presence of an organic solvent such as chloroform, to form the 3,4-dihydroisoquinoline of the formula

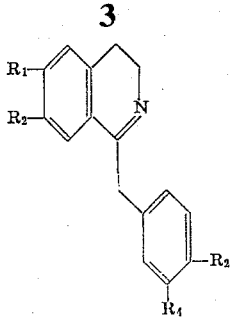

wherein $R_1$, $R_2$, $R_3$ and $R_4$ have the above-assigned meanings. Phosphorus pentachloride is preferred over the other halogenated derivatives of phosphorus since it results in a higher yield and a more readily isolated and purified product.

The 3,4-dihydroisoquinoline is aromatized or dehydrogenated by the action of palladium-on-charcoal, preferably in the presence of an organic solvent such as tetralin, to form the isoquinoline, which is thereafter acidified with hydrogen chloride to form the hydrochloride salt of the isoquinoline of the formula

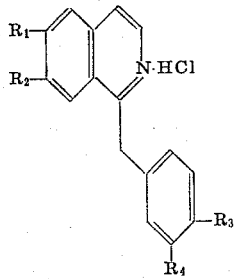

wherein $R_1$, $R_2$, $R_3$ and $R_4$ have the above-assigned meanings.

The hydrochloride salt of the isoquinoline is cyclized with a mixture of acetic anhydride and sulfuric acid to form the dehydroberbinium sulfoacetate of the formula

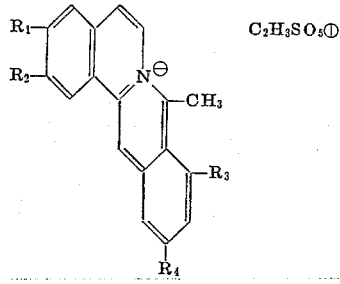

wherein $R_1$, $R_2$, $R_3$ and $R_4$ have the above-assigned meanings. This compound corresponds to Formula I with X being sulfoacetate.

The dehydroberbinium sulfoacetate may be converted by reaction with an alkali metal salt of the formula MX wherein M is an alkali metal and X represents a halide, nitrate, sulfate or phosphate, to the other dehydroberbinium salts of Formula I.

The following example illustrates the invention without, however, limiting it, by setting forth in more detail the procedures for the synthesis of coralyne sulfoacetate and coralyne chloride.

EXAMPLE

To a stirred solution of 39.2 g (0.20 mole) of homoveratric acid [(3,4-dimethoxyphenyl) acetic acid] in 250 ml of dry chloroform (molecular sieve 4A) was added dropwise, with ice-cooling, 72 g (0.61 mole) of thionyl chloride. The reaction mixture was heated between 45°–50° C. on a water bath for 2 hours after which it was allowed to stand overnight at room temperature. Solvent and excess thionyl chloride was removed under reduced pressure at a temperature below 50° C. The resulting residue (44 g of the acid chloride) was dissolved in 600 ml of anhydrous ether. The solution was then added dropwise, under nitrogen with ice-cooling, to a stirring mixture of 44 g (0.24 mole) of homoveratrylamine [β-(3,4-dimethoxyphenyl) ethylamine] in 900 ml of aqueous 1N KOH and 200 ml of ether. The addition took approximately 20 minutes. The reaction mixture was stirred continuously in an ice bath for 3 hours. The resulting solid was collected by filtration and washed thoroughly with 3 × 100 ml of water. It was dried in vacuo to give 69.2 g (95 percent yield) of N-(3,4-dimethoxyphenethyl)-2-(3,4-dimethoxyphenyl) acetamide having a melting point of 122–124° C., sufficiently pure for use in the next step. Recrystallization of 1.5 g of the crude product from a mixture of 20 ml of ethanol and 40 ml of water give 1.2 g of analytically pure product having a melting point of 123–125° C. $\lambda_{max}^{EtOH}$ 233 (log $\epsilon$ 4.16) and 277 nm (log $\epsilon$ 4.08).

Analysis — Calculated for $C_{20}H_{25}NO_5$: C, 66.83; H, 7.02; N, 3.90. Found C, 67.02; H, 7.02; N, 3.86.

A solution of 44 g (0.122 mole) of N-(3,4-dimethoxyphenethyl)-2-(3,4-dimethoxyphenyl) acetamide in 320 ml of dry chloroform was slowly added over a period of approximately 15 minutes under nitrogen with ice cooling, to a stirred suspension of 52 g (0.25 mole) of phosphorus pentachloride in 150 ml of dry chloroform. After the addition was complete, the mixture was stirred in an ice bath for 2 hours yielding a light brown solution. It was allowed to stir continuously at room temperature for 2 days under nitrogen while protected from moisture. The hydrochloride salt of the product started to precipitate after several hours. The mixture was then diluted with 800 ml of anhydrous ether and the salt was collected by filtration. It was washed with 2 × 300 ml of ether and dried in vacuo to give 60 g of crude product.

One-half of this (30 g) was dissolved in 300 ml of chloroform and filtered into 1,200 ml of ether while stirring in an ice bath. The white hydrochloride salt of the dihydroisoquinoline was collected by filtration, washed with 2 × 80 ml of ether, and dried to give 20 g (87 percent yield) of purified hydrochloride salt of 1-(3,4-dimethoxybenzyl)-6,7-dimethoxy-3,4-dihydroisoquinoline, having a melting point of 178°–180° C. $\lambda_{max}^{EtOH}$ 236 (log $\epsilon$ 4.26), 306 (log $\epsilon$ 3.98) and 360 nm (log $\epsilon$ 3.94).

Analysis — Calculated for $C_{20}H_{23}NO_4 \cdot HCl$: C, 63.57; H, 6.40; N, 3.71. Found: C, 63.22; H, 6.57; N, 3.67.

The remaining half (30 g) of the crude product was suspended in 400 ml of ice water. The pH of the mixture was adjusted to 8 with 100 ml of 25 percent aqueous ammonia, and the mixture was extracted with 5 × 350 ml of chloroform. The extract was washed with 4 × 150 ml of water and dried ($K_2CO_3$). Chloroform was then removed in vacuo to yield 18 g of the free base 1-(3,4-dimethoxybenzyl)-6,7-dimethoxy-3,4-dihydroisoquinoline, having a melting point of 100°–110° C. This was used for the following dehydrogenation process without further purification. Since the free base is readily oxidizable to an aminoketone, exposure of the free base in air should be avoided as much as possible. The product should be stored under nitrogen or other inert atmosphere.

Under a stream of dry nitrogen, a stirred mixture of 18 g. (0.053 mole) of the aforementioned free base 1-(3,4-dimethoxybenzyl)-6,7-dimethoxy-3,4-dihydroisoquinoline and 4 g of 10 percent palladium-on-charcoal in 60 ml of freshly distilled tetralin was heated in an oil bath at 220°–230° C. for 3 hours. The reaction flask was fitted with an air condensor and the latter connected to a drying tube. The reaction mixture was cooled to around 160°–180° C. and the catalyst separated by filtration under nitrogen. The original reaction flask and the catalyst were rinsed and washed with 2 × 25 ml of ethanol and the washings were combined with the cooled filtrate. With cooling and stirring, the mixture was acidified to pH 1 with 40 ml of 20 percent ethanolic hydrogen chloride. The resulting dark brown mixture was filtered and the filtrate quickly added to 1,200 ml of ether, with stirring. The precipitated salt of the isoquinoline was collected by filtration, washed with 2 × 100 ml of anhydrous ether, and dried to give 16.3 g (82 percent yield) of the hydrochloride salt of 1-(3,4-dimethoxybenzyl)-6,7-dimethoxyisoquinoline having a melting point of 222–224° C. $\lambda_{max}^{EtOH}$ 239 (log $\epsilon$ 4.68), 280 (log $\epsilon$ 3.86), 311 (log $\epsilon$ 3.81), 326 nm (log $\epsilon$ 3.81) and $\lambda_{sh}^{EtOH}$ 252 nm (log $\epsilon$ 4.49).

To 36 ml of acetic anhydride was added dropwise, with stirring, 7.2 ml of concentrated sulfuric acid. The mixture was heated at 80°–90° C. for approximately 10 minutes until a red wine color was noted. To this was added 9 g of the aforementioned hydrochloride salt of 1-(3,4-dimethoxybenzyl)-6,7-dimethoxyisoquinoline. The resulting dark brown solution was heated at 85°–90° C. on a water bath for approximately 30 minutes until solids started to appear. The mixture was then cooled and to it was slowly added, with stirring, 150 ml of methanol. Stirring was continued for 20 minutes following the addition. The mixture was chilled in an ice bath for 30 minutes and the solid product was collected by filtration and washed with 2 × 20 ml of methanol, 2 × 50 ml of ether, and dried to give 9.1 g (76 percent yield) of bright yellow crystals of coralyne-sulfoacetate having a melting point of 278°–280° C. An additional 1 g was isolated from the mother liquor after standing to raise the total yield to 83 percent. An analytical sample was prepared by recrystalization from methanol, m.p. 278°–280° C. $\lambda_{max}^{EtOH}$ 220 (log $\epsilon$ 4.39), 233 (log $\epsilon$ 4.37), 243 (log $\epsilon$ 4.32), 286 (log $\epsilon$ 4.59), 300 (log $\epsilon$ 4.74), 310 (log $\epsilon$ 4.78), 326 (log $\epsilon$ 4.66), 361 (log 68 3.94), 405 (log $\epsilon$ 4.17) and 425 nm (log $\epsilon$ 4.29); IR:1735 Cm$^{-1}$ (acetate carbonyl); NMR(CF$_3$COOH): $\tau$ 1.62 (1s, H$_1$), $\tau$ 2.30 (1s, H$_4$), $\tau$ 2.00 (1d, H$_5$), $\tau$ 1.20 (1d, H$_6$), $\tau$ 6.53 (3s, CH$_3$), $\tau$ 2.14 (1s, H$_9$), $\tau$ 2.40 (1s, H$_{12}$), $\tau$ 0.63 (1s, H$_{13}$), $\tau$ 5.71, 5.80 (6d, OCH$_3$); J H$_5$, H$_6$ = 8 cps; m/e = 363 (M+C$_2$H$_6$SO$_5$).

Analysis - Calculated for C$_{24}$H$_{25}$NO$_9$S: C, 57.25; H, 5.00; N, 2.78. Found: C, 57.52; H, 4.82; N, 2.98.

To a stirred yellow solution of 3 g of the aforementioned coralyne sulfoacetate in 250 ml of water was added 300 ml of 10 percent sodium chloride. Fine, yellow crystals of coralyne chloride gradually separated from the stirring and cooling, the product was collected by filtration and washed with 2 × 10 ml of dilute salt solution followed by 2 × 50 ml of ether. After drying at 100° C. in vacuo, 2.5 g (approximately 100 percent yield) of coralyne chloride was obtained, having a melting point of 248°–250° C. (At about 240° C., the color of the solid changed from yellow to red). An analytical sample was prepared by either (1) dissolving 0.1 g of the product in 100 ml of water and reprecipitating it with 5 ml of 15 percent hydrochloric acid or (2) recrystallization of 0.1 g of product from 80 ml of ethanol, m.p. 250°–252° C. The IR of this compound did not show the acetate carbonyl peak at 1735 Cm$^{-1}$. $\lambda_{max}^{EtOH}$ 234 (log $\epsilon$ 4.36), 241 (log $\epsilon$ 4.32), 284 (log $\epsilon$ 4.46), 300 (log $\epsilon$ 4.72), 310 (log $\epsilon$ 4.77), 325(log $\epsilon$ 4.66), 360 (log $\epsilon$ 3.84), 405 (log $\epsilon$ 4.17) and 425 nm (log $\epsilon$ 4.28).

Analysis - Calculated for C$_{22}$H$_{22}$ClNO$_4$. ½ H$_2$O: C, 64.62; H, 5.70; N, 3,43. Found: C, 64.35; H, 5.57; N, 3.25.

The melting point, IR, UV and NMR of this compound were found to be identical with those of naturally occurring coralyne chloride. The above process resulted in a 56 percent overall yield of the final product.

Other compounds corresponding to Formula I may similarly be prepared by means of the above-described process by substituting for the (3,4-dimethoxyphenyl) acetic acid other phenylacetic acids such as (3,4-diethoxyphenyl) acetic acid (3,4-dihydroxyphenyl) acetic acid, (3-methoxy-4-ethoxyphenyl) acetic acid, (3-ethoxy-4-methoxyphenyl) acetic acid, (3-methoxyphenyl) acetic acid, (3-ethoxyphenyl) acetic acid and the like, and/or by substituting for the $\beta$- (3,4-dimethoxyphenyl) ethylamine other $\beta$- phenylethylamines such as $\beta$-(3,4-diethoxyphenyl ethylamine), $\beta$-(3,4-dihydroxyphenyl) ethylamine, $\beta$-(3-methoxy-4-ethoxyphenyl) -ethylamine, $\beta$-(3-ethoxy-4-methoxyphenyl) ethylamine, $\beta$-(3-methoxyphenyl) ethylamine, $\beta$-(3-ethoxyphenyl) ethylamine and the like, and/or by substituting for the sodium chloride other alkali metal salts such as sodium nitrate, sodium sulfate, sodium phosphate and the like.

Coralyne chloride and coralyne sulfoacetate have been found to possess antineoplastic activity against the P–388 lymphocytic and L–1210 lymphoid leukemia test systems. When administered parenterally to animals inflicted with these strains, in daily dosages of from about 10 mg. to about 1,000 mg., advantageously from about 100 mg. to about 400 mg., these salts have been found to produce an average increase in survival time of approximately 100 percent in the case of the P–388 strain and approximately 35 percent in the case of the L–1210 strain.

What is claimed is:

1. A process for the preparation of a dehydroberbinium sulfoacetate of the formula

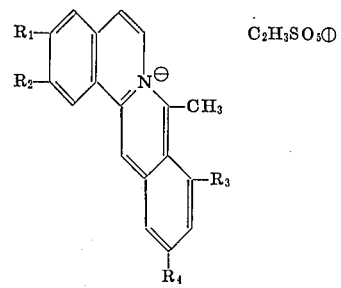

wherein $R_1$ and $R_2$ are members selected from the group consisting of hydrogen, hydroxy, methoxy, ethoxy and, when taken together, methylenedioxy; and $R_3$ and $R_4$ are members selected from the group consisting of hydrogen, hydroxy, methoxy and ethoxy, which comprises the steps of a. reacting a phenylacetic acid of the formula

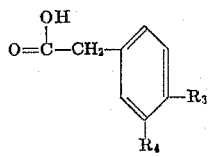

wherein $R_3$ and $R_4$ have the above-assigned meanings, with thionyl chloride, b. condensing the resulting phenylacetyl chloride of the formula

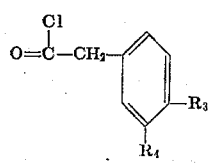

wherein $R_3$ and $R_4$ have the above-assigned meanings, with a β-phenylethylamine of the formula

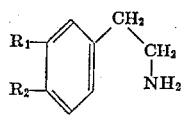

wherein $R_1$ and $R_2$ have the above-assigned meanings, in the presence of a base, c. cyclizing the resulting phenylacetamide of the formula

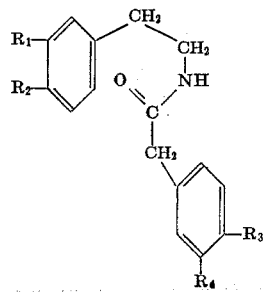

wherein $R_1$, $R_2$, $R_3$ and $R_4$ have the above-assigned meanings, by the action of a halogenated derivative of pentavalent phosphorus, d. aromatizing the resulting 3,4-dihydroisoquinoline of the formula

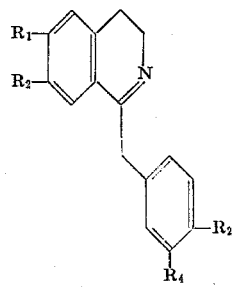

wherein $R_1$, $R_2$, $R_3$ and $R_4$ have the above-assigned meanings, by the action of palladium-on-charcoal and thereafter acidifying the product with hydrogen chloride, e. cyclizing the resulting hydrochloride salt of the isoquinoline of the formula

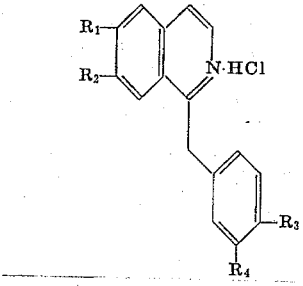

wherein $R_1$, $R_2$, $R_3$ and $R_4$ have the above-assigned meanings, with a mixture of acetic anhydride and sulfuric acid, and f. recovering said dehydroberbinium sulfoacetate.

2. A process in accordance with claim 1 wherein said phenylacetic acid is (3,4-dimethoxyphenyl) acetic acid.

3. A process in accordance with claim 1 wherein said β-phenylethylamine is β-(3,4-dimethoxyphenyl) ethylamine.

4. A process in accordance with claim 1 wherein said halogenated derivative of pentavalent phosphorus is phosphorus pentachloride.

5. A process in accordance with claim 4 wherein the cyclization of said phenylacetamide is carried out in the presence of a chloroform solvent.

6. A process in accordance with claim 1 wherein the aromatization of said 3,4-dihydroisoquinoline is carried out in the presence of a tetralin solvent.

7. A process in accordance with claim 1 wherein said dehydroberbinium sulfoacetate is further reacted with an alkali metal salt of the formula MX wherein M is an alkali metal and X is a member selected from the group consisting of a halide, nitrate, sulfate and phosphate.

8. A process for the preparation of coralyne chloride which comprises the steps of a. reacting (3,4-dimethoxyphenyl) acetic acid with thionyl chloride, b. condensing the resulting (3,4-dimethoxyphenyl) acetyl chloride with β-(3,4-dimethoxyphenyl) ethylamine in the presence of a base, c. cyclizing the resulting N-(3,4-dimethoxyphenethyl)-2-(3,4-dimethoxyphenyl) acetamide by the action of a halogenated derivative of pentavalent phosphorus, d. aromatizing the resulting 1-(3,4-dimethoxybenzyl)-6,7-dimethoxy-3,4-dihydroisoquinoline by the action of palladium-on-charcoal and thereafter acidifying the product with hydrogen chloride, e. cyclizing the resulting hydrochloride salt of 1-(3,4-dimethoxybenzyl)-6,7-dimethoxyisoquinoline with a mixture of acetic anhydride and sulfuric acid, f. reacting the resulting coralyne sulfoacetate with an alkali metal chloride, and g. recovering said coralyne chloride.

9. A process in accordance with claim 8 wherein said halogenated derivative of pentavalent phosphorus is phosphorus pentachloride.

10. A process in accordance with claim 9 wherein the cyclization of said N-(3,4-dimethoxyphenethyl)-2-(3,4-dimethoxyphenyl) acetamide is carried out in the presence of a chloroform solvent.

11. A process in accordance with claim 8 wherein the aromatization of said 1-(3,4-dimethoxybenzyl)-6,7-dimethoxy-3,4-dihydroisoquinoline is carried out in the presence of a tetralin solvent.

12. A process in accordance with claim 8 wherein said alkali metal chloride is sodium chloride.

* * * * *